US008889321B2

(12) United States Patent
Bruder et al.

(10) Patent No.: US 8,889,321 B2
(45) Date of Patent: *Nov. 18, 2014

(54) METHOD FOR PRODUCING A HOLOGRAPHIC FILM

(75) Inventors: Friedrich-Karl Bruder, Krefeld (DE); Dennis Hönel, Zülpich-Wichterich (DE); Marc-Stephan Weiser, Leverkusen (DE); Thomas Rölle, Leverkusen (DE); Thomas Fäcke, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 192 days.

This patent is subject to a terminal disclaimer.

(21) Appl. No.: 13/504,402

(22) PCT Filed: Nov. 2, 2010

(86) PCT No.: PCT/EP2010/066587
§ 371 (c)(1),
(2), (4) Date: May 17, 2012

(87) PCT Pub. No.: WO2011/054791
PCT Pub. Date: May 12, 2011

(65) Prior Publication Data
US 2012/0219883 A1 Aug. 30, 2012

(30) Foreign Application Priority Data
Nov. 3, 2009 (EP) .................................. 09013768

(51) Int. Cl.
*G03H 1/02* (2006.01)
*G11B 7/26* (2006.01)
*G11B 7/24044* (2013.01)
*G11B 7/245* (2006.01)

(52) U.S. Cl.
CPC *G11B 7/245* (2013.01); *G11B 7/26* (2013.01); *G11B 7/24044* (2013.01)
USPC ...................................... 430/1; 430/2; 359/3

(58) Field of Classification Search
None
See application file for complete search history.

(56) References Cited

U.S. PATENT DOCUMENTS 5,679,710 A * 10/1997 Davy et al. ..................... 514/547
5,725,970 A * 3/1998 Martin et al. ..................... 430/2

(Continued)

FOREIGN PATENT DOCUMENTS

EP         134861   * 4/1985
EP         684222   * 11/1995

(Continued)

OTHER PUBLICATIONS

Williams et al., "Urethane-Acrylated Resins for UV-Curable Powder Coatings: A Versatile Chemistry to look for Excellence", RadTech 2005 Europe 8 pages (2005).*

(Continued)

*Primary Examiner* — Martin Angebranndt
(74) *Attorney, Agent, or Firm* — Drinker Biddle & Reath LLP

(57) ABSTRACT

The invention relates to a method for producing a holographic film, wherein a photopolymer formulation comprising matrix polymers, writing monomers, photoinitiator system, and optionally auxiliary materials and additives is provided, the photopolymer formulation is applied as a film to the surface of a substrate, and the film is dried, wherein a photopolymer formulation having a plateau module G0 of =0.03 MPa is used. The invention further relates to a holographic medium that can be obtained by means of the method according to the invention.

17 Claims, 2 Drawing Sheets

(56) References Cited

U.S. PATENT DOCUMENTS

| | | | |
|---|---|---|---|
| 6,403,702 B1* | 6/2002 | Markusch et al. | 524/590 |
| 6,627,354 B1* | 9/2003 | Chandross et al. | 430/1 |
| 8,222,314 B2* | 7/2012 | Roelle et al. | 522/174 |
| 8,329,773 B2* | 12/2012 | Facke et al. | 522/97 |
| 8,361,678 B2* | 1/2013 | Weiser et al. | 430/1 |
| 2002/0142227 A1* | 10/2002 | Dhar et al. | 430/1 |
| 2002/0150712 A1* | 10/2002 | Ohtaki et al. | 428/40.1 |
| 2006/0128822 A1* | 6/2006 | Katou et al. | 522/7 |
| 2007/0070477 A1* | 3/2007 | Eto et al. | 359/12 |
| 2007/0172742 A1* | 7/2007 | Yachi et al. | 430/1 |
| 2008/0161444 A1* | 7/2008 | Hayashi et al. | 522/81 |
| 2008/0312403 A1* | 12/2008 | Stockel et al. | 528/59 |
| 2009/0012202 A1* | 1/2009 | Jacobine et al. | 522/90 |
| 2009/0087753 A1* | 4/2009 | Satou et al. | 430/2 |
| 2010/0036013 A1 | 2/2010 | Roelle et al. | |
| 2010/0086860 A1* | 4/2010 | Roelle et al. | 430/2 |
| 2010/0086861 A1* | 4/2010 | Weiser et al. | 430/2 |
| 2010/0087564 A1* | 4/2010 | Weiser et al. | 522/95 |
| 2010/0112459 A1* | 5/2010 | Weiser et al. | 430/2 |
| 2010/0112460 A1* | 5/2010 | Satou et al. | 430/2 |
| 2010/0203241 A1* | 8/2010 | Weiser et al. | 427/162 |
| 2010/0247839 A1* | 9/2010 | Hayashida et al. | 428/64.4 |
| 2011/0065827 A1 | 3/2011 | Facke et al. | |
| 2011/0189591 A1* | 8/2011 | Weiser et al. | 430/2 |
| 2011/0207029 A1* | 8/2011 | Hagen et al. | 430/2 |
| 2011/0236803 A1* | 9/2011 | Weiser et al. | 430/2 |
| 2011/0311905 A1 | 12/2011 | Honel et al. | |
| 2011/0311906 A1* | 12/2011 | Rolle et al. | 430/2 |
| 2012/0214089 A1* | 8/2012 | Honel et al. | 430/2 |
| 2012/0214090 A1* | 8/2012 | Weiser et al. | 430/2 |
| 2012/0214895 A1* | 8/2012 | Rolle et al. | 522/78 |
| 2012/0219883 A1* | 8/2012 | Bruder et al. | 430/2 |
| 2012/0219884 A1* | 8/2012 | Weiser et al. | 430/2 |
| 2012/0219885 A1* | 8/2012 | Facke et al. | 430/2 |
| 2012/0231376 A1* | 9/2012 | Rolle et al. | 430/2 |
| 2012/0231377 A1* | 9/2012 | Weiser et al. | 430/2 |
| 2012/0237856 A1* | 9/2012 | Rolle et al. | 430/2 |
| 2012/0302659 A1* | 11/2012 | Rolle et al. | 522/173 |
| 2012/0321997 A1* | 12/2012 | Rolle et al. | 430/2 |
| 2012/0321998 A1* | 12/2012 | Rolle et al. | 430/2 |
| 2013/0224634 A1* | 8/2013 | Berneth et al. | 430/2 |
| 2013/0252140 A1* | 9/2013 | Facke et al. | 430/2 |

FOREIGN PATENT DOCUMENTS

| | | |
|---|---|---|
| EP | 0700949 A2 | 3/1996 |
| EP | 09001952.2 | 2/2009 |
| EP | 09002180.9 | 2/2009 |
| EP | 09009651.2 | 7/2009 |
| EP | 2110718 * | 10/2009 |
| EP | 2154129 A1 | 2/2010 |
| EP | 2219075 A1 | 8/2010 |
| EP | 2396358 A1 | 12/2011 |
| WO | WO-03/014178 A1 | 2/2003 |
| WO | 2008/123303 * | 10/2008 |
| WO | WO-2008/125199 A1 | 10/2008 |

OTHER PUBLICATIONS

Anton Parr, Instruction Manual Physica MCR series, Physica MCR 51/101/301/501, Physica Smartpave 42 pages (2006).*

Wypych, Handbook of Plasticizers, Chapter 2, pp. 7-71 (2004).*

Talebi "Disentangled polyethylene with a sharp molar mass distribution; Implications for sintering", Univ. Eindhoven thesis, 124 pages (2008).*

International Search Report for PCT/EP2010/066587 mailed Jan. 12, 2011.

* cited by examiner

METHOD FOR PRODUCING A HOLOGRAPHIC FILM

CROSS-REFERENCE TO RELATED APPLICATIONS

This application is a national stage application (under 35 U.S.C. §371) of PCT/EP2010/066587, filed Nov. 2, 2010, which claims benefit of European application 09013768.8, filed Nov. 3, 2009, both of which are incorporated herein by reference in their entirety for all their useful purposes.

BACKGROUND

The invention relates to a process for producing a holographic film and to holographic film obtainable by the process.

Holographic films can be produced, for example, with the aid of special photopolymer formulations. Thus, for example, WO 2008/125199 A1 describes a photopolymer formulation which contains polyurethane-based matrix polymers, an acrylate-based writing monomer and photoinitiators. If a layer of the photopolymer formulation is cured, the writing monomer and the photoinitiators are embedded with an isotropic distribution in space in the resulting polyurethane matrix. In this way, a film into which holograms can be incorporated by exposure to light is obtained.

This can be effected by means of the superposition of two coherent light sources, a three-dimensional structure which in general can be described by a regional change in the refractive index (refractive index modulation $\Delta n$) forming in the medium. Such structures are referred to as holograms, which can also be described as diffractive optical elements. The optical functions which are performed by such a hologram depend on the specific exposure to light.

For the uses of photopolymer formulations, the refractive index modulation $\Delta n$ produced by the holographic exposure to light in the photopolymer plays the decisive role. During the holographic exposure to light, the interference field of signal and reference light beam (in the simplest case, that of two plane waves is formed by the local photopolymerization of, for example, highly refractive acrylates at sites of high intensity in the interference field in a refractive index grating. The refractive index grating in the photopolymer (the hologram) contains all information of the signal light beam. By exposing the hologram only to the reference light beam, the signal can then be reconstructed. The strength of the signal reconstructed in this manner in relation to the strength of the incident reference light is referred to as diffraction efficiency or DE below. In the simplest case of a hologram which forms from the superposition of two plane waves, the DE is obtained from the quotient of the intensity of the light diffracted in the reconstruction and the sum of the intensities of incident reference light and diffracted light. The higher the DE, the more efficient is a hologram with respect to the quantity of reference light which is required in order to make the signal visible with a fixed brightness.

Highly refractive acrylates are capable of producing refractive index gratings having a high amplitude between regions with low refractive index and regions with high refractive index and hence permitting holograms with high DE and high $\Delta n$ in photopolymer formulations. It should be noted that DE is dependent on the product of $\Delta n$ and the photopolymer layer thickness d. The greater the product, the greater the possible DE (for reflection holograms). The width of the angular range in which the hologram becomes visible (reconstructed), for example in the case of exposure to monochromatic light, depends only on the layer thickness d. In the case of exposure of the hologram to, for example, white light, the width of the spectral region which can contribute to the reconstruction of the hologram likewise depends only on the layer thickness d. The smaller d, the greater are the respective acceptance widths.

If it is intended to produce bright and readily visible holograms, a high $\Delta n$ and small thickness d should be strived for, in particular so that DE is as large as possible. This means that the higher $\Delta n$, the more latitude achieved for establishing the layer thickness d for bright holograms without loss of DE. The optimization of $\Delta n$ in the optimization of photopolymer formulations is therefore of outstanding importance (P. Hariharan, Optical Holography, 2nd Edition, Cambridge University Press, 1996).

Attempts have therefore been made to date to realize as high a $\Delta n$ as possible by changing the composition of the photopolymer formulations used for the production of the holographic films. However, it has been found that the photopolymer formulations developed in laboratory experiments cannot be used without considerable problems in some cases for the industrial production of holographic films.

Such an industrial production process is described, for example, in European Patent Application not laid open as yet and having the application number 09001952.2. In this process, a photopolymer formulation is applied to a substrate material and then dried at elevated temperature. In this way, holographic media in the form of films can be obtained.

If the photopolymer formulations optimized in laboratory experiments for a high $\Delta n$ are used in the process described above, films on which the photopolymer formulation does not have sufficient mechanical stability are obtained in many cases. This is particularly disadvantageous since the films cannot be wound up as rolls. Thus, for example, a displacement of the photopolymer on application of pressure through the protective film may occur or the tack of the photopolymer is so great that, when the protective film is peeled off, as may be necessary for holographic exposure, the photopolymer layer or at least the surface thereof is destroyed.

It has therefore not been directly possible to date to use laboratory formulations for producing holographic films on the industrial scale.

BRIEF DESCRIPTION OF EMBODIMENTS

It was therefore an object of the present invention to provide a (industrial) process with the aid of which it is possible to produce holographic films with sufficient mechanical stability and, in particular, which can be wound up as rolls.

This object is achieved by a process for producing a holographic film in which
  i) a photopolymer formulation comprising
    A) matrix polymers as an amorphous network
    B) a combination of a monofunctional writing monomer and of a polyfunctional writing monomer
    C) a photoinitiator system
    D) optionally a non-photopolymerizable component
    E) optionally catalysts, free radical stabilizers, solvents, additives and other auxiliaries and/or additives is provided,
  ii) the photopolymer formulation is applied as a film extensively to a substrate and
  iii) the film is dried,
a photopolymer formulation having a plateau modulus of ≥0.03 MPa being used.

It was found that mechanically stable, windable holographic films can be produced if a photopolymer formulation which has a plateau modulus of ≥0.03 MPa is used.

In the context of the present application, plateau modulus is understood as meaning the real part of the complex shear modulus (also referred to as storage modulus) of the unexposed photopolymer formulation.

Preferably, a photopolymer formulation having a plateau modulus of ≥0.03 MPa and ≤1 MPa, preferably of ≥0.05 MPa and ≤1 MPa, particularly preferably of ≥0.1 MPa and ≤1 MPa and especially preferably of ≥0.1 MPa and ≤0.6 MPa can be used.

According to a further preferred embodiment of the invention, it is intended to apply a laminating film to the film after the drying in step iii). The film can then preferably be rolled up together with the laminating film.

The plateau modulus of the photopolymer formulation can be determined in particular by measuring the complex shear modulus of the photopolymer formulation in an oscillation rheometer with plate-plate geometry. Particularly if the matrix component A consists of reactive components (e.g. a 2-component system), the trend in the shear modulus of the photopolymer formulation as a function of time over the curing time of the matrix component can be monitored thereby, at the end of which the plateau modulus occurs as the real part of the resulting complex shear modulus. In order to enable the measurement of the plateau modulus to be carried out more easily, the photoinitiator system (component C)) in the photopolymer formulation can be dispensed with.

BRIEF DESCRIPTION OF THE DRAWINGS

The foregoing brief description, as well as the following detailed description, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the drawings.

DETAILED DESCRIPTION OF EMBODIMENTS

Figure 1:
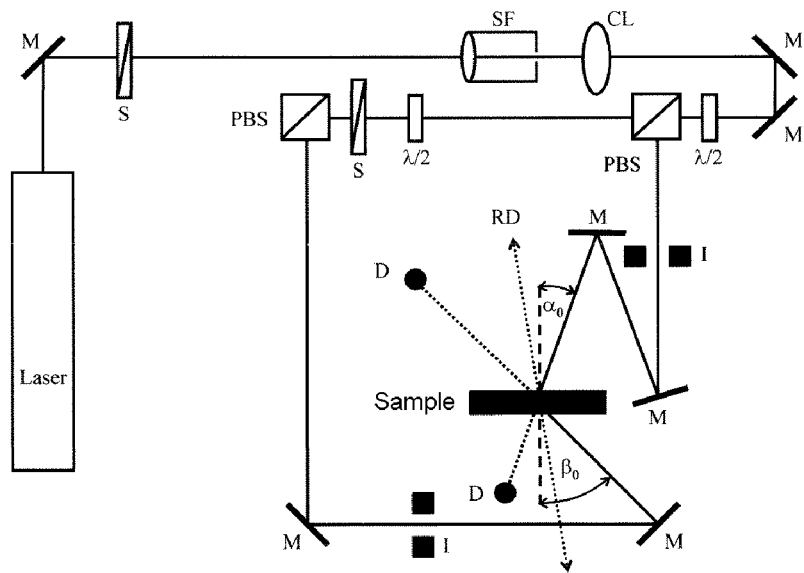
FIG. 1 illustrates an experimental setup to measure the diffraction efficiency (DE) of holographic the media.

The matrix polymers (component A) can preferably be polyurethanes, which are obtainable in particular by reacting an isocyanate component a) with an isocyanate-reactive component b).

The isocyanate component a) preferably comprises polyisocyanates. Polyisocyanates which may be used are all compounds known per se to a person skilled in the art or mixtures thereof, which have on average two or more NCO functions per molecule. These may have an aromatic, araliphatic, aliphatic or cycloaliphatic basis. Monoisocyanates and/or polyisocyanates containing unsaturated groups may also be concomitantly used in minor amounts.

For example, butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis(4,4'-isocyanatocyclohexyl)methane and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-toluene diisocyanate, 1,5-naphthylene diisocyanate, 2,4'- or 4,4'-diphenylmethane diisocyanate and/or triphenylmethane 4,4',4''-triisocyanate are suitable.

Use of derivatives of monomeric di- or triisocyanates having urethane, urea, carbodiimide, acylurea, isocyanurate, allophanate, biuret, oxadiazinetrione, uretdione and/or iminooxadiazinedione structures is also possible.

The use of polyisocyanates based on aliphatic and/or cycloaliphatic di- or triisocyanates is preferred.

Particularly preferably, the polyisocyanates of component a) are di- or oligomerized aliphatic and/or cycloaliphatic di- or triisocyanates.

Isocyanurates, uretdiones and/or iminooxadiazinediones based on HDI and 1,8-diisocyanato-4-(isocyanatomethyl)octane or mixtures thereof are very particularly preferred.

Likewise, NCO-functional prepolymers having urethane, allophanate, biuret and/or amide groups can be used as component a). Prepolymers of component a) are obtained in a manner well known per se to the person skilled in the art by reacting monomeric, oligomeric or polyisocyanates a1) with isocyanate-reactive compounds a2) in suitable stoichiometry with optional use of catalysts and solvents.

Suitable polyisocyanates a1) are all aliphatic, cycloaliphatic, aromatic or araliphatic di- and triisocyanates known per se to the person skilled in the art, it being unimportant whether these were obtained by means of phosgenation or by phosgene-free processes. In addition, the higher molecular weight subsequent products of monomeric di- and/or triisocyanates having a urethane, urea, carbodiimide, acylurea, isocyanurate, allophanate, biuret, oxadiazinetrione, uretdione or iminooxadiazinedione structure, which are well known per se to a person skilled in the art, can also be used, in each case individually or in any desired mixtures with one another.

Examples of suitable monomeric di- or triisocyanates which can be used as component a1) are butylene diisocyanate, hexamethylene diisocyanate (HDI), isophorone diisocyanate (IPDI), trimethylhexamethylene diisocyanate (TMDI), 1,8-diisocyanato-4-(isocyanatomethyl)octane, isocyanatomethyl-1,8-octane diisocyanate (TIN), 2,4- and/or 2,6-toluene diisocyanate.

OH-functional compounds are preferably used as isocyanate-reactive compounds a2) for synthesizing the prepolymers. Said compounds are analogous to the OH-functional compounds as described below for the component b).

Allophanates may also be used as a mixture with other prepolymers or oligomers of component a1). In these cases, the use of OH-functional compounds having functionalities of 1 to 3.1 is advantageous. When monofunctional alcohols are used, those having 3 to 20 carbon atoms are preferred.

It is also possible to use amines for the prepolymer preparation. For example, ethylenediamine, diethylenetriamine, triethylenetetramine, propylenediamine, diaminocyclohexane, diaminobenzene, diaminobisphenyl, difunctional polyamines, for example, the Jeffamines®, amine-terminated polymers having number average molar masses of up to 10 000 g/mol or any desired mixtures thereof with one another are suitable.

For the preparation of prepolymers containing biuret groups, an excess of isocyanate is reacted with amine, a biuret group forming. In this case, suitable amines for the reaction with the di-, tri- and polyisocyanates mentioned are all oligomeric or polymeric, primary or secondary, difunctional amines of the abovementioned type. Examples of these are aliphatic biurets based on aliphatic amines and aliphatic isocyanates, in particular HDI and TMDI.

Preferred prepolymers are urethanes, allophanates or biurets obtained from aliphatic isocyanate-functional compounds and oligomeric or polymeric isocyanate-reactive compounds having number average molar masses of 200 to 10 000 g/mol.

The prepolymers described above preferably have residue contents of free monomeric isocyanate of less than 2% by weight, particularly preferably less than 1.0% by weight, very particularly preferably less than 0.5% by weight.

Of course, the isocyanate component may contain proportionately further isocyanate components in addition to the prepolymers described. It is optionally also possible for the isocyanate component a) proportionately to contain isocyanates which have been partly reacted with isocyanate-reactive ethylenically unsaturated compounds.

It is optionally also possible for the abovementioned isocyanate component a) to contain, completely or proportionately, isocyanates which have been reacted completely or partly with blocking agents known to the person skilled in the art from coating technology. The following may be mentioned as an example of blocking agents: alcohols, lactams, oximes, malonic esters, alkyl acetoacetates, triazoles, phenols, imidazoles, pyrazoles and amines, such as, for example, butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester or any desired mixtures of these blocking agents.

In principle, all polyfunctional, isocyanate-reactive compounds which have on average at least 1.5 isocyanate-reactive groups per molecule can be used as component b).

Isocyanate-reactive groups in the context of the present invention are preferably hydroxy, amino or thio groups; hydroxy compounds are particularly preferred.

Suitable polyfunctional, isocyanate-reactive compounds are, for example, polyester, polyether, polycarbonate, poly(meth)acrylate and/or polyurethane polyols.

In addition, aliphatic, araliphatic or cycloaliphatic di-, tri- or polyfunctional alcohols having low molecular weights, i.e. having molecular weights of less than 500 g/mol, and short chains, i.e. containing 2 to 20 carbon atoms, are also suitable as polyfunctional, isocyanate-reactive compounds as constituents of component b).

These may be, for example, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butyl-propanediol, trimethylpentanediol, positional isomers of diethyloctanediol, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropionic acid (2,2-dimethyl-3-hydroxypropyl ester). Examples of suitable triols are trimethylolethane, trimethylolpropane or glycerol. Suitable higher-functional alcohols are ditrimethylolpropane, pentaerythritol, dipentaerythritol or sorbitol.

Suitable polyester polyols are, for example, linear polyester diols or branched polyester polyols, as are obtained in a known manner from aliphatic, cycloaliphatic or aromatic di- or polycarboxylic acids or their anhydrides with polyhydric alcohols having an OH functionality of ≥2. Preferred polyester polyols are based on aliphatic alcohols and mixtures of aliphatic and aromatic acids and have number average molar masses between 500 and 10 000 g/mol and functionalities between 1.8 and 6.1.

The polyester polyols may also be based on natural raw materials, such as castor oil. It is also possible for the polyester polyols to be based on homo- or copolymers of lactones, as can preferably be obtained by an addition reaction of lactones or lactone mixtures in a ring-opening lactone polymerization, such as butyrolactone, ε-caprolactone and/or methyl-ε-caprolactone, with hydroxy-functional compounds, such as polyhydric alcohols having an OH functionality of ≥2 or polyols having a functionality of greater than 1.8, for example of the abovementioned type.

Examples of polyols which are used as starters here are polyether polyols having a functionality of 1.8 to 3.1 and number average molar masses of 200 to 4000 g/mol; poly(tetrahydrofurans) having a functionality of 1.9 to 2.2 and number average molar masses of 500 to 2000 g/mol are preferred. As adducts are butyrolactone, ε-caprolactone and/or methyl-ε-caprolactone, ε-caprolactone is particularly preferred.

Suitable polycarbonate polyols are obtainable in a manner known per se by reaction of organic carbonates or phosgene with diols or diol mixtures.

Suitable organic carbonates are dimethyl, diethyl and diphenyl carbonate.

Suitable diols or mixtures comprise the polyhydric alcohols mentioned in the context of the polyester segments and having an OH functionality of ≥2, preferably 1,4-butanediol, 1,6-hexanediol and/or 3-methylpentanediol, or polyester polyols can be converted into polycarbonate polyols.

Suitable polyether polyols are polyadducts of cyclic ethers with OH- or NH-functional starter molecules, which polyadducts optionally have a block structure.

Suitable cyclic ethers are, for example, styrene oxides, ethylene oxide, propylene oxide, tetrahydrofuran, butylene oxide, epichlorohydrin and any desired mixtures thereof.

Starters which may be used are the polyhydric alcohols mentioned in the context of the polyester polyols and having an OH functionality of ≥2 and primary or secondary amines and amino alcohols.

Preferred polyether polyols are those of the abovementioned type, exclusively based on propylene oxide or random or block copolymers based on propylene oxide with further 1-alkylene oxides, the proportion of the 1-alkylene oxide not being higher than 80% by weight. Propylene oxide homopolymers and random or block copolymers which have oxyethylene, oxypropylene and/or oxybutylene units are particularly preferred, the proportion of the oxypropylene units, based on the total amount of all oxyethylene, oxypropylene and oxybutylene units, accounting for at least 20% by weight, preferably at least 45% by weight. Here, oxypropylene and oxybutylene comprise all respective linear and branched C3- and C4-isomers.

Preferably used special polyether polyols are those which consist of an isocyanate-reactive component comprising hydroxy-functional multiblock copolymers of the type Y(Xi-H)n with i=1 to 10 and n=2 to 8 and number average molecular weights of greater than 1500 g/mol, the segments Xi each being composed of oxyalkylene units of the formula (I),

 formula (I)

in which R is a hydrogen, alkyl, or aryl radical which can also be substituted or may be interrupted by heteroatoms (such as ether oxygens), Y is the underlying starter and the proportion of the segments Xi, based on the total amount of the segments Xi and Y, accounts for at least 50% by weight.

In formula (I), R is preferably a hydrogen, a methyl, butyl, hexyl or octyl group or an alkyl radical containing ether groups. Preferred alkyl radicals containing ether groups are those based on oxyalkylene units.

The multiblock copolymers $Y(X_i—H)_n$ preferably have number average molecular weights of more than 1200 g/mol, particularly preferably more than 1950 g/mol, but preferably not more than 12 000 g/mol, particularly preferably not more than 8000 g/mol.

Preferably used block copolymers of the structure $Y(X_i—H)_n$ consist of more than 50 percent by weight of the blocks $X_i$ described above as being in accordance with the invention and have a number average total molar mass of greater than 1200 g/mol.

Preferred combinations of component a) and b) in the preparation of the matrix polymers are:

α) Adducts of butyrolactone, ε-caprolactone and/or methyl-ε-caprolactone with polyether polyols having a functionality of 1.8 to 3.1 and number average molar masses of 200 to 4000 g/mol in combination with isocyanurates, uretdiones, iminooxadiazinediones and/or other oligomers based on HDI. Particularly preferably adducts of ε-caprolactone with poly(tetrahydrofurans) having a functionality of 1.9 to 2.2 and number average molar masses of 500 to 2000 g/mol (in particular 600 to 1400 g/mol), the number average total molar mass of which is from 800 to 4500 g/mol, in particular from 1000 to 3000 g/mol, in combination with oligomers, isocyanurates and/or iminooxadiazinediones based on HDI.

β) Polyether polyols having number average molar masses of 500 to 8500 g/mol and OH functionalities of 1.8 to 3.2, exclusively based on propylene oxide, or random or block copolyols based on propylene oxide and ethylene oxide, the proportion of ethylene oxide not being higher than 60% by weight, in combination with urethanes, allophanates or biurets obtained from aliphatic isocyanate-functional compounds and oligomeric or polymeric isocyanate-reactive compounds having number average molar masses of 200 to 6000 g/mol. Propylene oxide homopolymers having number average molar masses of 1800 to 4500 g/mol and OH functionalities of 1.9 to 2.2 in combination with allophanates obtained from HDI or TMDI and difunctional polyether polyols (in particular polypropylene glycols) having number average molar masses of 200 to 2100 g/mol are particularly preferred.

γ) Polyether block or multiblock copolymers of the formula (I), in which Y is a purely aliphatic polycarbonate polyol or a polymer of tetrahydrofuran having in each case an OH functionality of 1.8 to 3.1 and a number average molar masses of 400 to 2000 g/mol, n is 2, i is 1 or 2 and R is methyl or H, having a total number average molar mass of 1950 to 9000 g/mol in combination with urethanes, allophanates or biurets obtained from aliphatic isocyanate-functional compounds and oligomeric or polymeric isocyanate-reactive compounds having number average molar masses of 200 to 6000 g/mol or in combination with isocyanurates, uretdiones, iminooxadiazinediones and/or other oligomers based on HDI. Polyether block or multiblock copolymers of the formula (I), in which Y is a purely aliphatic polycarbonate polyol based on 1,4-butanediol and/or 1,6-hexanediol with dimethyl or diethyl carbonate or a polymer of tetrahydrofuran having an OH functionality of 1.8 to 2.2 and a number average molar masses of 600 to 1400 g/mol (in particular up to 1000 g/mol), n is 2, i is 1 or 2 and R is methyl or H, the proportion of ethylene oxide units, based on the total mass of $X_i$, not being higher than 60% by weight, in combination with allophanates obtained from HDI or TMDI and difunctional polyether polyols (in particular polypropylene glycols) having number average molar masses of 200 to 2100 g/mol, in combination with biurets having number average molar masses of 200 to 1400 g/mol (in particular also as a mixture with other oligomers of difunctional aliphatic isocyanates), based on aliphatic diamines or polyamines and aliphatic diisocyanates, in particular HDI and TMDI, in combination with urethanes obtained from HDI or TMDI and based on adducts of butyrolactone, ε-caprolactone and/or methyl-ε-caprolactone (in particular ε-caprolactone) with aliphatic, araliphatic or cycloaliphatic di-, tri- or polyfunctional alcohols containing 2 to 20 carbon atoms (in particular with difunctional aliphatic alcohols having 3 to 12 carbon atoms), having number average molar masses of 200 to 3000 g/mol, particularly preferably of 1000 to 2000 g/mol (in particular as a mixture with other oligomers of difunctional aliphatic isocyanates) or in combination with isocyanurates, iminooxadiazinediones and/or other oligomers based on HDI are particularly preferred.

One or more different compounds which have groups reacting under the action of actinic radiation with ethylenically unsaturated compounds with polymerization (radiation-curing groups) and are themselves free of NCO groups are used as component B).

In component B), compounds such as α,β-unsaturated carboxylic acid derivatives, such as acrylates, methacrylates, maleates, fumarates, maleimides, acrylamides, furthermore vinyl ethers, propenyl ethers, allyl ethers and compounds containing dicyclopentadienyl units and olefinically unsaturated compounds, such as, for example, styrene, α-methylstyrene, vinyltoluene, olefins, such as, for example, 1-octene and/or 1-decene, vinyl esters, (meth)acrylonitrile, (meth)acrylamide, methacrylic acid, acrylic acid, can be used. Acrylates and methacrylates are preferred.

In general, esters of acrylic acid or methacrylic acid are designated as acrylates and methacrylates, respectively. Examples of acrylates and methacrylates which can be used are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, 2,4,6-trichlorophenyl acrylate, 2,4,6-trichlorophenyl methacrylate, 2,4,6-tribromophenyl acrylate, 2,4,6-tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoxyethoxyethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, propane-2,2-diylbis[(2,6-dibromo-4,1-phenylen)oxy(2-{[3,3,3-tris(4-chlorophenyl) propanoyl]oxy}propane-3,1-diyl)oxyethane-2,1-diyl] diacrylate, bisphenol A diacrylate, bisphenol A dimethacrylate, tetrabromobisphenol A diacrylate, tetrabromobisphenol A dimethacrylate and the ethoxylated analogue compounds thereof, N-carbazolyl acrylates to mention but a selection of acrylates and methacrylates which can be used.

Of course, urethane acrylates can also be used as component B). Urethane acrylates are understood as meaning compounds having at least one acrylate group which additionally have at least one urethane bond. It is known that such compounds can be obtained by reacting a hydroxy-functional acrylate with an isocyanate-functional compound.

Acrylates and methacrylates having a refractive index $n_D^{20}$ (as measured at a wavelength of 405 nm) of greater than 1.450 are preferably used. Acrylates which contain at least one aromatic structural unit and have a refractive index $n_D^{20}$ of greater than 1.500 are particularly preferably used. Acrylates and methacrylates based on bisphenol A or derivatives thereof and those acrylates and methacrylates which contain a thioaryl group may be mentioned as particularly suitable examples thereof.

Examples of the urethane acrylates and/or urethane methacrylates used as component B) are the adducts of aromatic triisocyanates (very particularly preferably tris(4-phenylisocyanate) thiophosphate, or trimers of aromatic diisocyanates, such as toluene diisocyanate) with hydroxyethyl acrylate, hydroxypropyl acrylate, 4-hydroxybutyl acrylate, the adducts of 3-thiomethylphenyl isocyanate with hydroxyethyl acrylate, hydroxypropyl acrylate, 4-hydroxybutyl acrylate and unsaturated glycidyl ether acrylate urethanes (as described in the applications WO 2008/125229 A1 and in the non-prior-published application EP 09009651.2) or any desired mixtures thereof with one another.

Furthermore, the use of glycidyl ether acrylate urethanes as writing monomers is preferred. These comply with the general formula (IIa) or (IIb) or mixtures of (IIa) and (IIb)

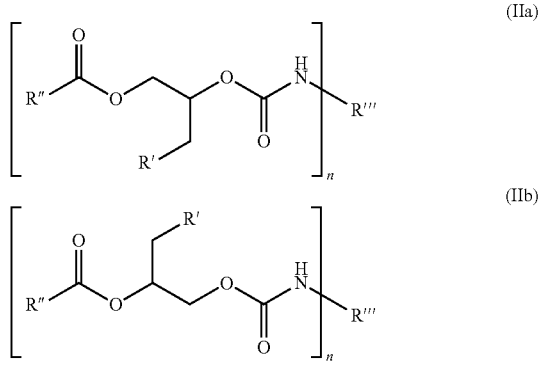

in which
n is a natural number from 2 to 6,
R' is a mono- or polynuclear organic radical containing aromatic groups and having 4 to 36 carbon atoms,
R" is an olefinically unsaturated radical having 3 to 30 carbon atoms and
R''' is an organic radical derived from an aliphatic or aromatic di- or polyisocyanate and having 2 to 30 carbon atoms.

The unsaturated glycidyl ether acrylate urethanes of the formula IIa or IIIb can be prepared in a 2-stage synthesis. In the first reaction, an unsaturated carboxylic acid is reacted with an epoxide, a mixture of two alcohols being formed. Of course, in this reaction step, it is also possible to react unsaturated epoxides with any desired carboxylic acids to give the analogous intermediate. In a second reaction step, this alcohol mixture is urethanized by means of di- or polyisocyanate R''' (NCO)$_n$ of functionality n to give the glycidyl ether acrylate urethane (as described in the non-prior-published application EP 09002180.9). Methacrylic acid and acrylic acid or derivatives thereof or aromatic carboxylic acids are preferably used for the reaction with an unsaturated epoxide; epoxides used are preferably aromatic or unsaturated epoxides, such as phenyl, dibromophenyl, naphthyl or biphenyl glycidyl ether or glycidyl (meth)acrylate and toluene diisocyanate (TDI), hexamethylene diisocyanate (HDI) or triisocyanatononane (TIN) is preferably used as the isocyanate component.

In a very particularly preferred embodiment, the combinations of (acrylic acid, biphenyl glycidyl ether and TDI), (acrylic acid, phenyl glycidyl ether and TDI) and (acrylic acid, biphenyl glycidyl ether and HDI) are used.

The monofunctional writing monomer may have in particular the general formula (III)

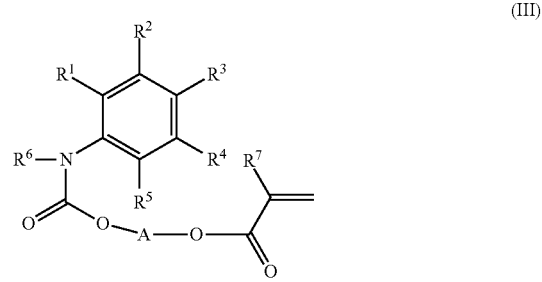

in which $R^1$, $R^2$, $R^3$, $R^4$, $R^5$, in each case independently of one another, are a hydrogen or halogen atom or a C1-C6-alkyl, trifluoromethyl, C1-C6-alkylthio, C1-C6-alkylseleno, C1-C6-alkyltelluro or nitro group, with the proviso that at least one substituent of the group $R^1$, $R^2$, $R^3$, $R^4$, $R^5$ is not hydrogen, $R^6$, $R^7$, in each case by themselves, are hydrogen or a C1-C6-alkyl group and A is a saturated or unsaturated or linear or branched C1-C6-alkyl radical or a polyethylene oxide radical or a polypropylene oxide radical having in each case 2-6 repeating units in the polymer chain, and the monofunctional writing monomer preferably has a glass transition temperature $T_G$ of <0° C. and preferably a refractive index of >1.50 at 589 nm.

The polyfunctional writing monomer may have, in particular, the general formula (IV)

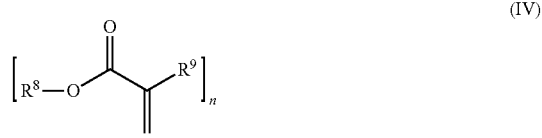

in which n is ≥2 and n is ≤4 and $R^8$, $R^9$ are hydrogen and/or, independently of one another, linear, branched, cyclic or heterocyclic organic radicals which are unsubstituted or optionally also substituted by heteroatoms. Furthermore, the polyfunctional writing monomer may preferably have a refractive index of >1.50 at 589 nm.

One or more photoinitiators are used as component C). The photoinitiator system used can preferably comprise an anionic, cationic or neutral dye and a coinitiator. Examples of these are mixtures of tetrabutylammonium triphenylhexylborate, tetrabutylammonium triphenylbutylborate, tetrabutylammonium trinaphthylbutylborate, tetrabutylammonium tris(4-tert-butyl)phenylbutylborate, tetrabutylammonium tris(3-fluorophenyl)hexylborate and tetrabutylammonium tris(3-chloro-4-methylphenyl)hexylborate with dyes such as, for example, astrazone orange G, methylene blue, new methylene blue, azur A, pyrillium I, safranine O, cyanine, gallocyanine, brilliant green, crystal violet, ethyl violet and thionine.

It is preferable if the photopolymer formulation specifically does not contain photopolymerizable additives (component D)). These additives may, in particular, be urethanes, where the urethanes may preferably be substituted by at least one fluorine atom.

Urethanes of the general formula (V)

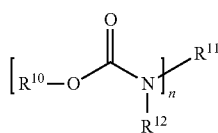

(V)

in which n is ≥1 and n is ≤8 and $R^{10}$, $R^{11}$, $R^{12}$ are hydrogen and/or, independently of one another, linear, branched, cyclic or heterocyclic organic radicals which are unsubstituted or optionally also substituted by heteroatoms, preferably at least one of the radicals $R^{10}$, $R^{11}$, $R^{12}$ being substituted by at least one fluorine atom and $R^{10}$ is particularly preferably an organic radical having at least one fluorine atom may particularly preferably be used as component D).

Further constituents of the photopolymer formulation may be (component E)): free radical stabilizers, optionally catalysts or other auxiliaries and additives.

Inhibitors and antioxidants, as described, for example, in "Methoden der organischen Chemie [Methods of Organic Chemistry]" (Houben-Weyl), 4th Edition, Vol. XIV/1, page 433 et seq., Georg Thieme Verlag, Stuttgart 1961, are suitable as examples of free radical stabilizers. Suitable classes of substances are, for example, phenols, such as, for example, 2,6-di-tert-butyl-4-methylphenol, cresols, hydroquinones, benzyl alcohols, such as, for example, benzhydrol, optionally also quinones, such as, for example, 2,5-di-tert-butylquinone, optionally also aromatic amines such as diisopropylamine or phenothiazine.

2,6-Di-tent-butyl-4-methylphenol, phenothiazine, p-methoxyphenol, 2-methoxy-p-hydroquinone and benzhydrol are preferred.

Optionally, one or more catalysts may be used. These are catalysts for accelerating the urethane formation. Known catalysts for this purpose are, for example, tin octoate, zinc octoate, dibutyltin dilaurate, dimethylbis[(1-oxoneodecyl)oxy]stannane, dimethyltin dicarboxylate, zirconium bis(ethylhexanoate), zirconium acetylacetonate or tertiary amines, such as, for example, 1,4-diazabicyclo[2.2.2]octane, diazabicyclononane, diazabicycloundecane, 1,1,3,3-tetramethylguanidine, 1,3,4,6,7,8-hexahydro-1-methyl-2H-pyrimido(1,2-a)pyrimidine.

Dibutyltin dilaurate, dimethylbis[(1-oxoneodecyl)oxy]stannane, dimethyltin dicarboxylate, 1,4-diazabicyclo[2.2.2]octane, diazabicyclononane, diazabicycloundecane, 1,1,3,3-tetramethylguanidine, 1,3,4,6,7,8-hexahydro-1-methyl-2H-pyrimido(1,2-a)pyrimidine are preferred.

Of course, further auxiliaries or additives can optionally be used (also component E)). These may be, for example, additives customary in the area of coating technology, such as solvents, plasticizers, levelling agents or adhesion promoters. It can also be advantageous to use a plurality of additives of one type simultaneously. Of course, it may also be advantageous to use a plurality of additives of a plurality of types.

For the coating of abovementioned photopolymer compositions on a roll coating unit, it must be ensured that the overall formulation, after the matrix (component (A)) has been cured and before exposure to light, has a plateau modulus $G_0$ of at least 0.03 MPa.

A film comprising the photopolymer formulation can be applied to a substrate film, for example with the aid of a roll coating unit.

This can be effected by a combination of different process steps in which positive metering pumps known to the person skilled in the art, vacuum devolatilizers, plate filters, static mixers, slot nozzles and various knifecoating systems, single-roll unwinders, dryers, dry lamination device and a single-roll winding device are used. In particular, a coating devices which have, for example, slot nozzles and knifecoating systems are suitable for the application of liquid photopolymer formulations to moving substrate materials and are distinguished by high accuracy in the applied layer thickness.

In a preferred embodiment, the process for coating the substrate film comprises the following individual steps for the treatment of abovementioned photopolymer formulation:

I. transport and metering firstly of the component a), optionally mixed with one or more of the components B), C), D) and E), and secondly, separately therefrom, of the component b), optionally mixed with one or more of the components B), C), D) and E)

II. devolatilization of the streams transported, metered and optionally premixed according to I)

III. filtration of the mixture obtained according to II)

IV. homogenization of the mixture obtained according to III)

V. unwinding and pre-treatment of the substrate film

VI. coating of the substrate film with the mixture obtained according to step IV)

VII. drying of the film coated according to VI)

VIII. lamination of the coated film obtained according to VII)

IX. winding up of the laminated film obtained according to VIII)

In a particularly preferred embodiment, the metering of the starting materials is effected either by gear pumps or by eccentric screw pumps. Centrifugal devolatilizers are used for devolatilizing the starting materials and plate filters for filtration. The mixing of the individual components is effected via a static mixer with appropriately desired mixing geometries, such as, for example, length and diameter. The preferably used coating unit is a slot die. The coated material is dried via air driers with the desired air temperature and moisture content over a defined period.

Figure 4:
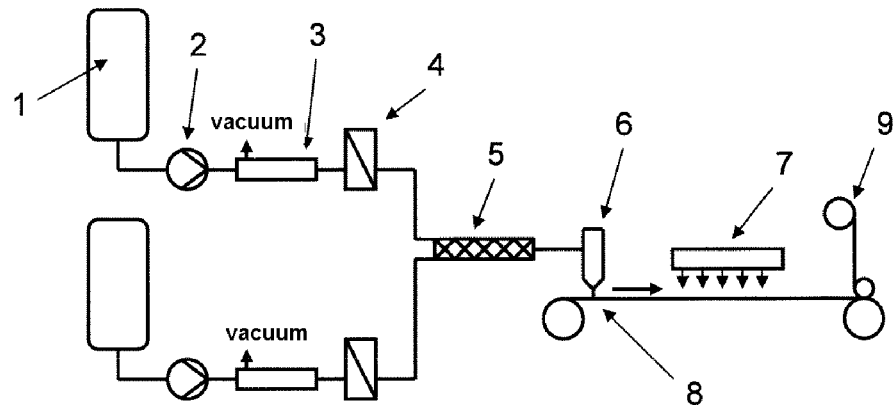
FIG. 4 illustrates a schematic setup of a typical coating unit.

FIG. 4 shows a schematic setup of a typical coating unit, including arrangement of the pre-treatment of the coating material (1-5), schematic path of the substrate film (8+9), coating device for application to the substrate film (6) and subsequent drying process (7).

In FIG. 4, the designations represent the following components:

1 Storage container
    2 Metering device
    3 Vacuum devolatilization
    4 Filter
    5 Static mixer
    6 Coating device
    7 Dryer
    8 Web path
    9 Product lamination By combining the process steps described, as shown in FIG. 4, photopolymer formulations may be applied on moving substrate materials in a high accuracy of layer thickness.

According to a further preferred embodiment, the holographic media may be film composites which may consist of one or more substrate films, one or more photopolymer layers and one or more protective films in any desired arrangement.

Preferred materials or material composites of the substrate layer are based on polycarbonate (PC), polyethylene terephthalate (PET), polybutylene terephthalate, polyethylene, polypropylene, cellulose acetate, cellulose hydrate, cellulose nitrate, cycloolefin polymers, polystyrene, polyepoxides, polysulphone, cellulose triacetate (CTA), polyamide, polymethyl methacrylate, polyvinyl chloride, polyvinyl butyral or polydicyclopentadiene or mixtures thereof. In addition, material composites, such as film laminates or coextrudates, can be used as substrate film. Examples of material composites are duplex and triplex films having a structure according to one of the schemes A/B, A/B/A or A/B/C, such as PC/PET, PET/PC/PET and PC/TPU (TPU=thermoplastic polyurethane). PC and PET are particularly preferably used as substrate film.

In addition to the constituents and can for the film composite have one or more covering layers on the photopolymer layer in order to protect it from dirt and environmental influences. Plastics films or film composite systems, but also clearcoats can be used for this purpose.

In addition, further protective layers, for example a backing of the substrate film, may be used.

The invention furthermore relates to a holographic medium obtainable by the process according to the invention.

The present invention still further relates to the use of the holographic films for recording visual holograms, for the production of optical elements, images, representations and a method for recording holograms with the use of the holographic films.

With the holographic films, holograms for optical applications in the entire visible range and in the near UV range (300-800 nm) can be produced by appropriate exposure processes. Visual holograms comprise all holograms which can be recorded by methods known to the person skilled in the art, including, inter alia, in-line (Gabor) holograms, off-axis holograms, full-aperture transfer holograms, white light transmission holograms ("rainbow holograms"), Denisyuk holograms, off-axis reflection holograms, edge-lit holograms and holographic stereograms; reflection holograms, Denisyuk holograms, transmission holograms are preferred. Optical elements, such as lenses, mirrors, deflection mirrors, filters, diffuser screens, diffraction elements, light conductors, waveguides, projection screens and/or masks, are preferred. Frequently, these optical elements show a frequency selectivity, depending on how the holograms were illuminated and on the dimensions of the hologram.

In addition, holographic images or representations, such as, for example, for personal portraits, biometric representations in security documents, or generally of images or image structures for advertising, security labels, trademark protection, trademark branding, labels, design elements, decorations, illustrations, multi-journey tickets, images and the like and images which can represent digital data, inter alia also in combination with the products described above, can also be produced by means of the holographic films. Holographic images may give the impression of a three-dimensional image but they may also represent image sequences, short films or a number of different objects, depending on from which angle, with which light source (including moving light source), etc. that is illuminated. Owing to these varied design possibilities, holograms, in particular volume holograms, are an attractive technical solution for the abovementioned application.

EXAMPLES

The invention is described in more detail below with the aid of examples.

Designations which are Used Below

Photopolymer formulations comprising:
three-dimensionally crosslinked matrix polymers A). Particularly preferred three-dimensionally crosslinked organic polymers are those which are composed of
an isocyanate component a)
and an isocyanate-reactive component b) as precursors and
are crosslinked with the aid of a catalyst component E) which as a rule is added in solution,
writing monomers B) which have groups which react under the action of actinic radiation with ethylenically unsaturated compounds with polymerization (radiation-curing groups) and are dissolved or distributed in this matrix
at least one photoinitiator system C)
optionally a non-photopolymerizable component D)
optionally catalysts, free radical stabilizers, solvents, additives and other auxiliaries and/or additives E)
F designates the photopolymer formulation without photoinitiator system C), which is used for determining the plateau modulus $G_0$.
M designates the holographic film comprising the corresponding photopolymer formulation F, which however was produced with the corresponding photoinitiator system C) for the visible range.

Methods of Measurement

Unless stated otherwise, all percentages denote percentage by weight.

The stated OH numbers were determined according to DIN 53240-2.

The stated NCO values (isocyanate contents) were determined according to DIN EN ISO 11909.

For the determination of the viscosity, the component or mixture to be investigated was applied in a cone-on-plate measuring system of a rheometer (from Anton Paar Physica Model MCR 51), at 20° C. The measurement is carried out under the following conditions:
Measuring body: cone CP 25, d=25 mm, angle=1
Measuring gap as distance between cone and plate: 0.047 mm
Duration of measurement: 10 sec.
Determination of viscosity at a shear rate of 250 l/sec.

Measurement of the Refractive Indices of the Photopolymerizable Writing Monomers (Component B))

The refractive index n as a function of the wavelength of the samples were obtained from the transmission and reflection spectra. For this purpose, about 100-300 nm thick films of the samples were applied to quartz glass supports from dilute solution in butyl acetate. The transmission and reflection spectrum of this layer packet was measured using a spectrometer from STEAG ETA-Optik, CD Measurement System ETA-RT, and the layer thickness and the spectral curve of n were then adapted to the measured transmission and reflection spectra in the range of 380-850 nm. This is effected using the internal software of the spectrometer and additionally requires the refractive index data of the quartz glass substrate, which were determined beforehand in a blank measurement. The refractive indices for the photopolymerizable monomers B) are based on the wavelength of 405 nm and therefore correspond to $n_D^{20}$.

Measurement of the Holographic Properties DE and Δn of the Holographic Media by Means of Two-Beam Interference in a Reflection Arrangement The holographic media (photopolymer films) produced as described below were subsequently tested for their holographic properties by means of a measuring arrangement according to FIG. 1, as follows:

For measuring the holographic performance, the protective film of the holographic film media (M) is peeled off and the holographic film is laminated on the photopolymer side onto a 1 mm thick glass plate suitable in length and width using a rubber roller with gentle pressure. This sandwich comprising glass and photopolymer film can now be used to determine the holographic performance parameters DE and Δn.

The beam of an He—Ne laser (emission wavelength 633 nm) was converted with the aid of the spatial filter (SF) and together with the collimation lens (CL) into a parallel homogenous beam. The final cross sections of the signal and reference beam are established by the iris diaphragms (I). The diameter of the iris diaphragm opening is 0.4 cm. The polarization-dependent beam splitters (PBS) split the laser beam into two coherent equally polarized beams. Via the λ/2 plates, the power of the reference beam was adjusted to 0.5 mW and the power of the signal beam to 0.65 mW. The powers were determined using the semiconductor detectors (D) with sample removed. The angle of incidence ($\alpha_0$) of the reference beam is −21.8° and the angle of incidence ($\beta_0$) of the signal beam is 41.8°. The angles are measured starting from the sample normal to the beam direction. According to FIG. 1, $\alpha_0$ therefore has a negative sign and $\beta_0$ a positive sign. At the location of the sample (medium), the interference field of the two overlapping beams produced a grating of light and dark strips which are perpendicular to the angle bisector of the two beams incident on the sample (reflection hologram). The strip spacing Λ, also referred to as grating period, in the medium is ~225 nm (the refractive index of the medium assumed to be ~1.504).

FIG. 1 shows the geometry of a holographic media tester (HMT) at λ=633 nm (He—Ne Laser): M=mirror, S=shutter, SF=spatial filter, CL=collimator lens, λ/2=λ/2 plate, PBS=polarization-dependent beam splitter, D=detector, I=iris diagram, $\alpha_0$=−21.8°, $\beta_0$=41.8° are the angles of incidence of the coherent beams, measured outside the sample (outside the medium). RD=reference direction of the turntable.

Using a holographic experimental setup as shown in FIG. 1, the diffraction efficiency (DE) of the media was measured.

Holograms were written into the medium in the following manner:

Both shutters (S) are opened for the exposure time t.

Thereafter, with closed shutters (S), the medium was allowed a time of 5 minutes for the diffusion of the still unpolymerized writing monomers.

The recorded holograms were read in the following manner. The shutter of the signal beam remained closed. The shutter of the reference beam was opened. The iris diaphragm of the reference beam was closed to a diameter of <1 mm. This ensured that the beam was always completely in the previously written hologram for all angles (Ω) of rotation of the medium. The turntable, under computer control, covered the angle range from $\Omega_{min}$ to $\Omega_{max}$ with an angle step width of 0.05° C. Ω is measured from the sample normal to the reference direction of the turntable. The reference direction of the turntable occurs when, during recording of the hologram, the angle of incidence of the reference beam and of the signal beam are of equal magnitude, i.e. $\alpha_0$=−31.8° and $\beta_0$=31.8°. $\Omega_{recording}$ is then 0°. For $\alpha_0$=−21.8° and $\beta_0$=41.8°, $\Omega_{recording}$ is therefore 10°. The following is generally true for the interference field during recording of the hologram:

$$\alpha_0 = \theta_0 + \Omega_{recording}.$$

$\theta_0$ is the semiangle in the laboratory system outside the medium and the following is true during recording of the hologram:

$$\theta_0 = \frac{\alpha_0 - \beta_0}{2}.$$

In this case, $\theta_0$ is therefore −31.8°. At each angle Ω of rotation approached, the powers of the beam transmitted in the zero order were measured by means of the corresponding detector D and the powers of the beam diffracted in the first order were measured by means of the detector D. At each angle Ω approached, the diffraction efficiency was obtained as the quotient of:

$$\eta = \frac{P_D}{P_D + P_T}$$

$P_D$ is the power in the detector of the diffracted beam and $P_T$ is the power in the detector of the transmitted beam.

By means of the method described above, the Bragg curve (it describes the diffraction efficiency η as a function of the angle Ω of rotation of the recorded hologram) was measured and was stored in a computer. In addition, the intensity transmitted in the zero order was also plotted against the angle Ω of rotation and was stored in a computer.

The maximum diffraction efficiency (DE=$\eta_{max}$) of the hologram, i.e. its peak value, was determined at $\Omega_{reconstruction}$. For this purpose, the position of the detector of the diffracted beam was changed if necessary, in order to determine this maximum value.

The refractive index contrast Δn and the thickness d of the photopolymer layer were now determined by means of the coupled wave theory (c.f. H. Kogelnik, The Bell System Technical Journal, Volume 48, November 1969, Number 9 page 2909-page 2947) from the measured Bragg curve and the angle variation of the transmitted intensity. It should be noted that, owing to the thickness shrinkage occurring as a result of the photopolymerization, the strip spacing Λ' of the hologram and the orientation of the strips (slant) may deviate from the strip spacing Λ of the interference pattern and the orientation thereof. Accordingly, the angle $\alpha_0$' or the corresponding angle of the turntable $\Omega_{reconstruction}$ at which maximum diffraction efficiency is achieved will also deviate from $\alpha_0$ or from the corresponding $\Omega_{recording}$, respectively. As a result, the Bragg condition changes. This change is taken into account in the evaluation method. The evaluation method is described below:

All geometrical quantities which relate to the recorded hologram and not to the interference pattern are represented as dashed quantities.

According to Kogelnik, the following is true for the Bragg curve η(Ω) of a reflection hologram:

$$\eta = \begin{cases} \dfrac{1}{1 - \dfrac{1-(\xi/v)^2}{\sin^2\left(\sqrt{\xi^2-v^2}\right)}}, & \text{for } v^2 - \xi^2 < 0 \\[2ex] \dfrac{1}{1 + \dfrac{1-(\xi/v)^2}{\sinh^2\left(\sqrt{v^2-\xi^2}\right)}}, & \text{for } v^2 - \xi^2 \geq 0 \end{cases}$$

with:

$$v = \frac{\pi \cdot \Delta n \cdot d'}{\lambda \cdot \sqrt{|c_s \cdot c_r|}}$$

$$\xi = -\frac{d'}{2 \cdot c_s} \cdot DP$$

$$c_s = \cos(\vartheta') - \cos(\psi') \cdot \frac{\lambda}{n \cdot \Lambda'}$$

$$c_r = \cos(\vartheta')$$

$$DP = \frac{\pi}{\Lambda'} \cdot \left(2 \cdot \cos(\psi' - \vartheta') - \frac{\lambda}{n \cdot \Lambda'}\right)$$

$$\psi' = \frac{\beta' + \alpha'}{2}$$

$$\Lambda' = \frac{\lambda}{2 \cdot n \cdot \cos(\psi' - \alpha')}$$

When reading the hologram ("reconstruction"), the situation is analogous to that described above:

$$\theta'_0 = \theta_0 + \Omega$$

$$\sin(\theta'_0) = n \cdot \sin(\theta')$$

At the Bragg condition, the dephasing DP is 0. Accordingly, the following is true:

$$\alpha'_0 = \theta_0 + \Omega_{reconstruction}$$

$$\sin(\alpha'_0) = n \cdot \sin(\alpha')$$

The still unknown angle $\beta'$ can be determined from the comparison of the Bragg condition of the interference field during recording of the hologram and the Bragg condition during reading of the hologram, assuming that only thickness shrinkage takes place. The following is then true:

$$\sin(\beta') = \frac{1}{n} \cdot [\sin(\alpha_0) + \sin(\beta_0) - \sin(\theta_0 + \Omega_{reconstruction})]$$

$v$ is the grating thickness, $\xi$ is the detuning parameter and $\psi'$ is the orientation (slant) of the refractive index grating which was recorded. $\alpha'$ and $\beta'$ correspond to the angles $\alpha_0$ and $\beta_0$ of the interference field during recording of the hologram, but measured in the medium and applicable to the grating of the hologram (after thickness shrinkage). n is the mean refractive index of the photopolymer and was set at 1.504. $\lambda$ is the wavelength of the laser light in vacuo.

The maximum diffraction efficiency (DE=$\eta_{max}$) for $\xi$=0 is then:

$$DE = \tanh^2(v) = \tanh^2\left(\frac{\pi \cdot \Delta n \cdot d'}{\lambda \cdot \sqrt{\cos(\alpha') \cdot \cos(\alpha' - 2\psi)}}\right)$$

Figure 2:
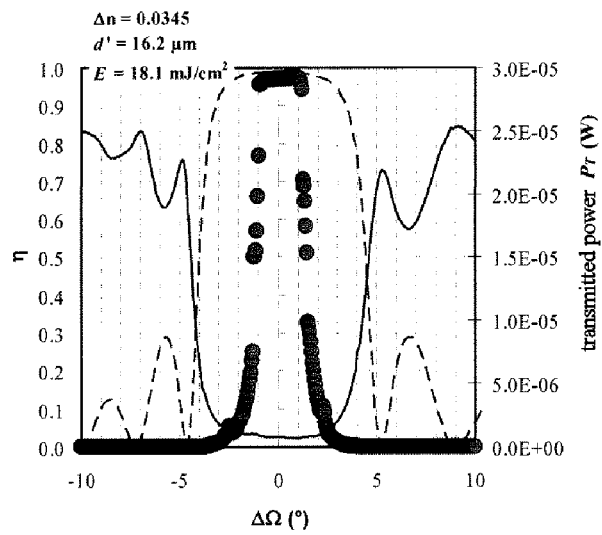
FIG. 2 illustrates a graph showing the measured data of the diffraction efficiency, the theoretical Bragg curve and the transmitted intensity plotted against the angle detuning.

FIG. 2 shows the measured transmitted power $P_T$ (right y axis) as a solid line plotted against the angle detuning $\Delta\Omega$, the measured diffraction efficiency $\eta$ (left y axis) as solid circles plotted against the angle detuning $\Delta\Omega$ (if permitted by the finite size of the detector) and the adaptation of the Kogelnik theory as a dashed line (left y axis).

The measured data of the diffraction efficiency, the theoretical Bragg curve and the transmitted intensity are plotted against the centred angle of rotation $\Delta\Omega = \Omega_{reconstruction} - \Omega = \alpha'_0 - \theta'_0$, also referred to as angle detuning, as shown in FIG. 2.

Since DE is known, the shape of the theoretical Bragg curve according to Kogelnik is determined only by the thickness d' of the photopolymer layer. $\Delta n$ is corrected via DE for a given thickness d' so that measurement and theory of DE always agree. d' is now adjusted until the angular positions of the first secondary minima of the theoretical Bragg curve correspond to the angular positions of the first secondary maxima of the transmitted intensity and in addition the full width at half maximum (FWHM) for the theoretical Bragg curve and for the transmitted intensity correspond.

Since the direction in which a reflection hologram rotates on reconstruction by means of an $\Omega$ scan, but the detector for the diffracted light can detect only a finite angular range, the Bragg curve of broad holograms (small d') is not completely registered with an $\Omega$ scan, but only the central region, with suitable detector positioning. The shape of the transmitted intensity which is complementary to the Bragg curve is therefore additionally used for adjusting the layer thickness d'.

FIG. 2 shows the plot of the Bragg curve $\eta$ according to the coupled wave theory (dashed line), of the measured diffraction efficiency (solid circles) and of the transmitted power (black solid line) against the angle detuning $\Delta\Omega$.

For one formulation, this procedure was possibly repeated several times for different exposure times t on different media in order to determine at which mean energy dose of the incident laser beam during recording of the hologram DE becomes the saturation value. The mean energy dose E is obtained as follows from the powers of the two partial beams coordinated with the angles $\alpha_0$ and $\beta_0$ (reference beam with $P_r$=0.50 mW and signal beam with $P_s$=0.63 mW), the exposure time t and the diameter of the iris diaphragm (0.4 cm):

$$E(\text{mJ/cm}^2) = \frac{2 \cdot [P_r + P_s] \cdot t(s)}{\pi \cdot 0.4^2 \text{ cm}^2}$$

The powers of the partial beams were adjusted so that, at the angles $\alpha_0$ and $\beta_0$ used, the same power density is reached in the medium.

As an alternative, a test equivalent to the setup shown in FIG. 1 was also carried out using a green laser having the emission wavelength $\lambda$ of 532 nm in vacuo. Here, $\alpha_0$=−11.5° and $\beta_0$=33.5° and $P_r$=1.84 mW and $P_s$=2.16 mW.

Measurement of the Plateau Modulus $G_0$ of the Photopolymers by Means of an Oscillation Rheometer in the Present Invention The still liquid formulation having the composition described below is introduced into the plate-plate measuring system of a rheometer (from Anton Paar Physica Model MCR 301, equipped with the oven model CTD 450 which was preheated to 50° C.). The curing of the matrix of the photopolymer formulation over the time is then measured under the following conditions:

Plate spacing 250 μm.

Oscillation measuring mode at a constant angular frequency $\omega_0$ of 10 rad/s and a regulated deformation amplitude of 1%.

Temperature 50° C., normal force regulation set at 0 Newton

Recording of the storage modulus G' over the measuring time up to a constant value $G_{max}$ of G' was reached or for not more than 3 hours.

Figure 3:
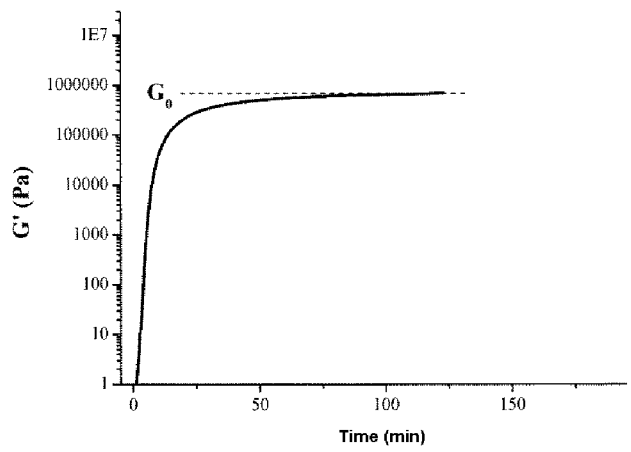
FIG. 3 illustrates a graph showing the variation of the curing of the matrix network (left) and testing for plateau behaviour (G' independently of ω) (right)

This value of the modulus is taken as the plateau modulus $G_0$ to be determined Examples of typical measured curves are to be found in FIG. 3.

FIG. 3 shows the variation of the curing of the matrix network (left) and testing for plateau behaviour (G' independently of ω) (right).

Description of the Formulation Constituents Used in the Examples

Isocyanates Used (Components a))

Component a1) is a product of Bayer MaterialScience AG, Leverkusen, Germany, hexane diisocyanate-based polyisocyanate, proportion of iminooxadiazinedione at least 30%, NCO content: 23.5%

Component a2) is an experimental product of Bayer MaterialScience AG, Leverkusen, Germany, aliphatic polyisocyanate based on hexane diisocyanate, NCO content about 20%.

Component a3) is a product of Bayer MaterialScience AG, Leverkusen, Germany, full allophanate of hexane diisocyanate on polypropylene glycol having a number average molar mass of about 280 g/mol, NCO content: 16.5-17.3%.

Component a4) is a commercially available product of Bayer MaterialScience AG, Leverkusen, Germany, mixture of 29.4 mol % of isocyanurate based on HDI with 70.6 mol % of the urethane of poly(ε-caprolactone) having a number average molar mass of 650 g/mol with HDI, NCO content 10.5-11.5%.

Component a5) is a commercially available product of Bayer MaterialScience AG, Leverkusen, Germany, aliphatic biuret type based on hexamethylene diisocyanate, NCO content: 22.5-23.5%.

Isocyanate-Reactive Components Used (Component b))

Polyol b1) is an experimental product of Bayer MaterialScience AG, Leverkusen, Germany; the preparation is described below.

Polyol b2) is an experimental product of Bayer MaterialScience AG, Leverkusen, Germany; the preparation is described below.

Polyol b3) is an experimental product of Bayer MaterialScience AG, Leverkusen, Germany; the preparation is described below.

Polyol b4) is an experimental product of Bayer MaterialScience AG, Leverkusen, Germany; the preparation is described below.

Catalyst Used (Component E))

Component E1): Urethanization catalyst, dimethylbis[(1-oxoneodecyl)oxy]stannane, commercially available product of Momentive Performance Chemicals, Wilton, Conn., USA.

Radiation-Curing Compounds Used (Component B))

Component B1) is an experimental product of Bayer MaterialScience AG, Leverkusen, Germany, the preparation is described below.

Component B2) is an experimental product of Bayer MaterialScience AG, Leverkusen, Germany, the preparation is described below.

Component B3) is an experimental product of Bayer MaterialScience AG, Leverkusen, Germany, the preparation is described below.

Photoinitiator Systems Used (Component C))

Coinitiator 1: tetrabutylammonium tris(3-chloro-4-methylphenyl)(hexyl)borate, [1147315-11-4] is an experimental product produced by Ciba Inc., Basel, Switzerland.

Dye 1 is new methylene blue (CAS 1934-16-3) and was obtained from SIGMA-ALDRICH CHEMIE GmbH, Steinheim, Germany.

Dye 2 is safranine O (CAS 477-73-6) and was obtained from SIGMA-ALDRICH CHEMIE GmbH, Steinheim, Germany.

Dye 3 is ethyl violet (CAS 2390-59-2) and was obtained in 80% purity from SIGMA-ALDRICH CHEMIE GmbH, Steinheim, Germany, and used in this form.

Dye 4 is astrazone orange G (CAS 3056-93-7) and was obtained from SIGMA-ALDRICH CHEMIE GmbH, Steinheim, Germany.

Description of component C1):

In a beaker, 0.05 g of dye 1, 0.05 g of dye 3, 0.05 g of dye 4 and 1.50 g of coinitiator 1 are dissolved in 3.50 g of N-ethylpyrrolidone in the dark or with suitable illumination. The corresponding percentages by weight of this solution are used for preparing the example media.

Description of component C2):

In a beaker, 0.05 g of dye 1, 0.05 g of dye 2, 0.05 g of dye 4 and 1.50 g of coinitiator 1 are dissolved in 3.50 g of N-ethyl pyrrolidone in the dark or with suitable illumination. The corresponding percentages by weight of this solution are used for preparing the example media.

Non-Photopolymerizable Components Used (Component D)

Description of component D1) bis(2,2,3,3,4,4,5,5,6,6,7,7-dodecafluoroheptyl)-(2,2,4-trimethylhexane-1,6-diyl)bis-carbamate In a 50 ml round-bottomed flask, 0.02 g of Desmorapid Z and 3.6 g of 2,4,4-trimethylhexane-1,6-diisocyanate (TMDI) were initially introduced and heated to 60° C. Thereafter, 11.9 g of 2,2,3,3,4,4,5,5,6,6,7,7-dodecafluoroheptan-1-ol were added dropwise and the mixture was further kept at 60° C. until the isocyanate content had fallen below 0.1%. Cooling was then effected. The product was obtained as a colourless oil.

Description of component D2) 2,2,3,3,4,4,5,5,6,6,7,7,8,8,9,9-hexadecafluorononyl butylcarbamate In a 1 l round-bottomed flask, 0.50 g of Desmorapid Z and 186 g of n-butyl isocyanate were initially introduced and heated to 60° C. Thereafter, 813 g of 2,2,3,3,4,4,5,5,6,6,7,7,8,8,9,9-hexadecafluorononanol were added dropwise and the mixture was further kept at 60° C. until the isocyanate content had fallen below 0.1%. Cooling was then effected. The product was obtained as a colourless oil.

Other Starting Materials

DMC catalyst: double metal cyanide catalyst based on zinc hexacyanocobaltate (III), obtainable by the process described in EP-A 700 949.

Irganox 1076 is octadecyl 3,5-di-(tert)-butyl-4-hydroxyhydrocinnamate (CAS 2082-79-3).

Byk® 310: silicone-based surface additive from BYK-Chemie GmbH, Wesel, 25% solution in xylene.

Preparation of the Components

Preparation of Polyol b1)

3.621 kg of a difunctional polytetrahydrofuran polyether polyol (equivalent weight 500 g/mol OH) were weighed into a 20 l reaction vessel equipped with a stirrer and 525 mg of DMC catalyst were added. Heating was then effected to 105° C. while stirring at about 70 rpm. By applying a vacuum and depressurizing with nitrogen three times, air was exchanged for nitrogen. After the stirrer speed had been increased to 300 rpm, nitrogen was passed through the mixture from below for 54 minutes with the vacuum pump running and at a pressure of about 0.1 bar. Thereafter, a pressure of 0.2 bar was established by means of nitrogen and 363 g of propylene oxide (PO) were passed in to initiate polymerization. As a result, the pressure increased to 2.42 bar. After 7 minutes, the pressure had fallen again to 0.34 bar and a further 11.379 kg of PO were metered in at 2.9 bar over a period of 2 h 29 min. 47 minutes after the end of the PO metering, a vacuum was applied at a residual pressure of 1.9 bar and complete degassing was effected. The product was stabilized by addition of 7.5 g of Irganox 1076 and obtained as a colourless, viscous liquid (OH number: 27.6 mg KOH/g, viscosity at 25° C.: 1498 mPas).

Preparation of Polyol b2)

2475 g of a difunctional polytetrahydrofuran polyether polyol (equivalent weight 325 g/mol OH) were weighed into a 20 l reaction vessel equipped with a stirrer and 452.6 mg of DMC catalyst were added. Heating to 105° C. was then effected while stirring at about 70 rpm. By applying a vacuum and depressurizing with nitrogen three times, air was exchanged for nitrogen. After the stirrer speed had been increased to 300 rpm, nitrogen was passed through the mixture from below for 57 minutes with the vacuum pump running and at a pressure of about 0.1 bar. Thereafter, a pressure of 0.5 bar was established by means of nitrogen and 100 g of ethylene oxide (EO) and 150 g of PO were passed in simultaneously to initiate the polymerization. As a result, the pressure increased to 2.07 bar. After 10 minutes, the pressure had fallen again to 0.68 bar and a further 5.116 kg of EO and 7.558 kg of PO as a mixture were passed in at 2.34 bar over a period of 1 h 53 min. 31 min after the end of the epoxide metering, a vacuum was provided at a residual pressure of 2.16 bar and complete degassing was effected. The product was stabilized by addition of 7.5 g of Irganox 1076 and was obtained as slightly turbid, viscous liquid (OH number 27.1 mg KOH/g, viscosity at 25° C.: 1636 mPas).

Preparation of Polyol b3)

0.18 g of tin octoate, 374.8 g of ε-caprolactone and 374.8 g of a difunctional polytetrahydrofuran polyether polyol (equivalent weight 500 g/mol OH) were initially introduced into a 1 l flask and heated to 120° C. and kept at this temperature until the solids content (proportion of the non-volatile constituents) was 99.5% by weight or higher. Thereafter, cooling was effected and the product was obtained as a waxy solid.

Preparation of Polyol b4)

2465 g of a difunctional polytetrahydrofuran polyether polyol (equivalent weight 325 g/mol OH) were weighed into a 20 l reaction vessel equipped with a stirrer and 450.5 mg of DMC catalyst were added. Heating to 105° C. was then effected while stirring at about 70 rpm. By applying a vacuum and depressurizing with nitrogen three times, air was exchanged for nitrogen. After the stirrer speed had been increased to 300 rpm, nitrogen was passed through the mixture from below for 72 minutes with the vacuum pump running and at a pressure of about 0.1 bar. Thereafter, a pressure of 0.3 bar was established by means of nitrogen and 242 g of propylene oxide (PO) were passed in to initiate the polymerization. As a result, the pressure increased to 2.03 bar. After 8 minutes, the pressure had fallen again to 0.5 bar and a further 12.538 kg of PO were metered in at 2.34 bar over a period of 2 h 11 min. 17 minutes after the end of the PO metering, a vacuum was applied at a residual pressure of 1.29 bar and complete degassing was effected. The product was stabilized by addition of 7.5 g of Irganox 1076 and obtained as a colourless, viscous liquid (OH number: 27.8 mg KOH/g, viscosity at 25° C.: 1165 mPas).

Preparation of component B1), (phosphorothioyltris(oxy-4,1-phenyleneiminocarbonyloxyethane-2,1-diyl)triacrylate)

0.1 g of 2,6-di-tert-butyl-4-methylphenol, 0.05 g of dibutyltin dilaurate (Desmorapid® Z, Bayer MaterialScience AG, Leverkusen, Germany) and and 213.07 g of a 27% strength solution of tris(p-isocyanatophenyl) thiophosphate in ethyl acetate (Desmodur® RFE, product of Bayer MaterialScience AG, Leverkusen, Germany) were initially taken in a 500 ml round-bottomed flask and heated to 60° C. Thereafter, 42.37 g of 2-hydroxyethyl acrylate were added dropwise and the mixture was further kept at 60° C. until the isocyanate content had fallen below 0.1%. Thereafter, cooling was effected and the ethyl acetate was completely removed in vacuo. The product was obtained as a semicrystalline solid. $n_D^{20}$:1.610.

Preparation of component B2) 2-({[3-(methylsulphanyl)phenyl]carbamoyl}oxy)ethyl prop-2-enoate)

0.02 g of 2,6-di-tert-butyl-4-methylphenol, 0.01 g of Desmorapid® Z, 11.7 g of 3-(methylthio)phenyl isocyanate were initially introduced and initially introduced into a 100 ml round-bottomed flask and heated to 60° C. Thereafter, 8.2 g of 2-hydroxyethyl acrylate were added dropwise and the mixture was further kept at 60° C. until the isocyanate content had fallen below 0.1%. Cooling was then effected. The product was obtained as a light yellow liquid. $n_D^{20}$:1.626.

Preparation of component B3) (mixture of (4-methylbenzene-1,3-diyl)-bis[carbamoyloxy-3-(biphenyl-2-yloxy)propane-2,1-diyl]bisacrylate and (4-methylbenzene-1,3-diyl)bis[carbamoyloxy-3-(biphenyl-2-yloxy)propane-1,2-diyl]bisacrylate and analogous isomers)

430.2 g of Denacol EX 142 (Nagase-Chemtex, Japan), 129.7 g of acrylic acid, 1.18 g of triphenylphosphine and 0.0056 g of 2,6-di-tert-butyl-4-methylphenol were initially introduced into a three-necked flask having a reflux condenser and stirrer. Air was slowly passed through the mixture and the latter was thermostated at 60° C. Stirring is then effected for 24 hours at 90° C. A clear liquid having an OH number of 157.8 mg KOH/g was obtained. 21.3 g of this intermediate product and 5.2 g of a mixture of 2,4- and 2,6-toluidene diisocyanate (Desmodur T80, Bayer MaterialScience AG, Leverkusen, Germany) were initially introduced into a three-necked flask having a reflux condenser and stirrer. Air was slowly passed through the mixture and the latter was thermostated at 60° C. After an initial exothermic reaction, the product was stirred for 24 hours at 60° C. A clear, colourless, glassy product having NCO of 0% was obtained. $n_D^{20}$: 1.643.

Preparation of the Samples and Example Media

Preparation of the Photopolymer Formulation (F) without Photoinitiator C) for Determining the Plateau Modulus $G_0$ of the Photopolymers For the preparation of the photopolymer formulation for determining the modulus $G_0$, the various writing monomers (components B) and optionally additives (parts of component E) are dissolved in the isocyanate-reactive component b) (as part of component A), optionally at 60° C. Optionally, heating to 60° C. is effected for not more than 10 minutes in a drying oven. Thereafter, isocyanate component a) (other part of component A) is added and mixing is effected in the Speedmixer for 1 minute. Subsequently, a solution of component E1) in butyl acetate is added and mixing is effected in the Speedmixer again for 1 minute (further parts of component E). The concentration of component E1) in butyl acetate is 10% by weight. The amounts of this solution which are described in Table 2 were used.

Table 2 lists the investigated examples of the photopolymer formulations without photoinitiator system C) for determining the plateau modulus $G_0$ of the photopolymers, which examples are prepared in this manner.

Exemplary Production of the Holographic Film Media (M) Based on Photopolymer Formulations with Photoinitiator for Determining Performance Parameter Δn For the preparation of the photopolymer formulation, the photopolymerizable writing monomers (component B1)+B2)), optionally the nonpolymerizable components D) and the urethanization catalyst (component E1)) dissolved in N-ethylpyrrolidone (10% by weight), then Byk® 310 (part of the component E)) are added stepwise to the components polyol (component b)) and mixed. Thereafter, a solution of the component C of the photopolymer solution is added in the dark and mixed so that a clear solution was obtained. Optionally, the formulation can be heated at 60° C. for a short time in order to promote the solubility of the starting materials. Finally, the corresponding isocyanate component a is added at 30° C. and mixing is effected again. The liquid material obtained is then applied by means of a knife coater or slot die to a 36 μm thick polyethylene terephthalate film and dried for 4.5 minutes at a drying temperature of 80° C. in an air-circulation dryer. The photopolymer layer is then covered with a 40 μm thick polyethylene film and is rolled up.

The desired target layer thickness of the dried photopolymers are preferably between 10 and 20 μm.

The production speeds are preferably in the range from 0.2 m/min to 300 m/min and particularly preferably in the range from 1.0 m/min to 50 m/min.

Table 3 lists the investigated examples of the photopolymer formulations which are used for the continuous preparation of holographic films with regard to their composition.

TABLE 2

| Photopolymer formulation without initiator | Isocyanate component | Proportion (g) | Isocyanate-reactive component | Proportion (g) | NCO:OH | Photopolymerizable monomer 1 | Proportion (% by weight) |
|---|---|---|---|---|---|---|---|
| F 1 | a1 | 0.366 | b1 | 4.121 | 1.02:1 | B1 | 15.0 |
| F 2 | a2 | 0.573 | b4 | 5.414 | 1.02:1 | B1 | 20.0 |
| F 3 | a1 | 0.706 | b3 | 3.781 | 1.02:1 | B1 | 15.0 |
| F 4 | a3 | 0.496 | b4 | 3.991 | 1.02:1 | B1 | 15.0 |
| F 5 | a3 | 0.534 | b2 | 3.950 | 1.02:1 | B1 | 15.0 |
| F 6 | a3 | 0.534 | b2 | 3.950 | 1.02:1 | B1 | 15.0 |
| F 7 | a4 | 0.757 | b2 | 3.730 | 1.02:1 | B1 | 15.0 |
| F 8 | a4 | 0.757 | b2 | 3.730 | 1.02:1 | B1 | 25.0 |
| F 9 | a5 | 0.370 | b2 | 4.117 | 1.02:1 | B1 | 25.0 |
| F 10 | a1 | 0.706 | b3 | 3.781 | 1.02:1 | B3 | 15.0 |
| F 11 | a3 | 0.534 | b2 | 3.950 | 1.02:1 | B3 | 15.0 |

| Photopolymer formulation without initiator | Photopolymerizable monomer 2 | Proportion (% by weight) | Non-photopolymerizable component | Proportion (% by weight) | Catalyst in solution (butyl acetate) | Proportion (g) |
|---|---|---|---|---|---|---|
| F 1 | B2 | 15.0 | D1 | 25.0 | E1 | 0.0300 |
| F 2 | B2 | 20.0 |  |  | E1 | 0.0300 |
| F 3 | B2 | 15.0 | D1 | 25.0 | E1 | 0.0300 |
| F 4 | B2 | 15.0 | D2 | 25.0 | E1 | 0.0300 |
| F 5 | B2 | 15.0 | D1 | 25.0 | E1 | 0.0300 |
| F 6 | B2 | 15.0 | D2 | 25.0 | E1 | 0.0300 |
| F 7 | B2 | 15.0 | D1 | 25.0 | E1 | 0.0300 |
| F 8 | B2 | 15.0 | D1 | 15.0 | E1 | 0.0300 |
| F 9 | B2 | 15.0 | D1 | 15.0 | E1 | 0.0300 |
| F 10 | B2 | 15.0 | D1 | 25.0 | E1 | 0.0300 |
| F 11 | B2 | 15.0 | D1 | 25.0 | E1 | 0.0300 |

TABLE 3

| Holographic medium | Isocyanate component | Proportion (g) | Isocyanate-reactive component | Proportion (g) | NCO:OH | Photo-polymerizable monomer 1 | Proportion (% by weight) | Photo-polymerizable monomer 2 | Proportion (% by weight) |
|---|---|---|---|---|---|---|---|---|---|
| M 1 | a1 | 0.647 | b1 | 7.213 | 1.02:1 | B1 | 15.0 | B2 | 15.0 |
| M 2 | a2 | 1.053 | b4 | 9.847 | 1.02:1 | B1 | 20.0 | B2 | 20.0 |
| M 3 | a1 | 1.231 | b3 | 6.647 | 1.02:1 | B1 | 15.0 | B2 | 15.0 |
| M 4 | a3 | 0.905 | b4 | 6.985 | 1.02:1 | B1 | 15.0 | B2 | 15.0 |
| M 5 | a3 | 0.940 | b2 | 6.950 | 1.02:1 | B1 | 15.0 | B2 | 15.0 |
| M 6 | a3 | 0.940 | b2 | 6.950 | 1.02:1 | B1 | 15.0 | B2 | 15.0 |
| M 7 | a4 | 1.387 | b2 | 6.453 | 1.02:1 | B1 | 15.0 | B2 | 15.0 |
| M 8 | a4 | 1.387 | b2 | 6.453 | 1.02:1 | B1 | 25.0 | B2 | 15.0 |
| M 9 | a5 | 0.682 | b2 | 7.158 | 1.02:1 | B1 | 25.0 | B2 | 15.0 |
| M 10 | a1 | 1.231 | b3 | 6.647 | 1.02:1 | B3 | 15.0 | B2 | 15.0 |
| M 11 | a3 | 0.940 | b2 | 6.950 | 1.02:1 | B3 | 15.0 | B2 | 15.0 |

| Holographic medium | Non-photopolymerizable component | Proportion (% by weight) | Photo-initiator | Proportion (g) | Byk 310 | Proportion (g) | Catalyst in solution | Proportion (g) | Corresponds to formulation without initiator |
|---|---|---|---|---|---|---|---|---|---|
| M 1 | D1 | 25.0 | C2 | 1.040 | X | 0.060 | E1 | 0.040 | F1 |
| M 2 |  |  | C1 | 0.940 | X | 0.060 | E1 | 0.100 | F2 |
| M 3 | D1 | 25.0 | C1 | 1.042 | X | 0.060 | E1 | 0.020 | F3 |
| M 4 | D2 | 25.0 | C1 | 1.012 | X | 0.060 | E1 | 0.038 | F4 |
| M 5 | D1 | 25.0 | C1 | 1.022 | X | 0.060 | E1 | 0.038 | F5 |
| M 6 | D2 | 25.0 | C1 | 1.010 | X | 0.060 | E1 | 0.040 | F6 |
| M 7 | D1 | 25.0 | C2 | 1.060 | X | 0.060 | E1 | 0.040 | F7 |
| M 8 | D1 | 15.0 | C2 | 1.060 | X | 0.060 | E1 | 0.040 | F8 |
| M 9 | D1 | 15.0 | C2 | 1.060 | X | 0.060 | E1 | 0.040 | F9 |
| M 10 | D1 | 25.0 | C2 | 1.060 | X | 0.060 | E1 | 0.040 | F10 |
| M 11 | D1 | 25.0 | C2 | 1.060 | X | 0.060 | E1 | 0.040 | F11 |

Results of $G_0$, Rollability and $\Delta n$ Combined

The following measured values for $G_0$ (MPa), the quality of the rollability and of $\Delta n$ at the dose E (mJ/cm$^2$) were obtained and are shown in Table 4. In this case, the values for $\Delta n$ marked with an *, instead of $\lambda$=633 nm, are measured with $\lambda$=532 nm.

| Example type | Holographic medium | $\Delta n$ | Corresponds to formulation without initiator | Proportion by weight (%) of components B based on the total formulation | $G_0$ | E | Rollability |
|---|---|---|---|---|---|---|---|
| Comparative Example 1 | M1 | 0.033* | F1 | 30.0 | 0.025 | 16-128 | − |
| Comparative Example 2 | M2 | 0.026 | F2 | 40.0 | 0.007 | 9-36 | −− |
| Example 1 | M3 | 0.034 | F3 | 30.0 | 0.489 | 9-36 | ++ |
| Example 2 | M4 | 0.027* | F4 | 30.0 | 0.031 | 16-128 | + |
| Example 3 | M5 | 0.031* | F5 | 30.0 | 0.090 | 16-128 | + |
| Example 4 | M6 | 0.033 | F6 | 30.0 | 0.085 | 9-36 | + |
| Example 5 | M7 | 0.036 | F7 | 30.0 | 0.052 | 9-36 | + |
| Example 6 | M8 | 0.036 | F8 | 40.0 | 0.049 | 9-36 | + |
| Example 7 | M9 | 0.034 | F9 | 40.0 | 0.034 | 9-36 | + |
| Example 8 | M10 | 0.037 | F10 | 30.0 | 0.242 | 9-36 | ++ |
| Example 9 | M11 | 0.034 | F11 | 30.0 | 0.044 | 9-36 | + |

Good blockability and rollability are obtained at values of $G_0$>0.03 MPa. $G_0$ should preferably be >0.05 MPa and very particularly preferably >0.1 MPa.

For evaluating the rollability, two features are to be assessed in the finished product. Firstly, the homogeneity of the photopolymer layer thickness is visually rated. The edge regions of the photopolymer in the running direction of the web are particularly striking here and to be rated as good. Mostly slight unevenness in the layer thicknesses due to the colouring of the photopolymer can be observed here, which may result from a shift of material on application of pressure through the protective film.

As further aspect, the tack of the photopolymer layer is rated. In the case of this rating, the protective film is peeled off the photopolymer. During the process, the tack can be empirically determined via the applied force for peeling off and the observation of the interface between photopolymer and protective film. Here, the possible destruction of the photopolymer during peeling is a particularly strong indication of very good adhesion between photopolymer and protective film, which in turn is brought about by too low a blocking resistance of the polymer.

The ratings of the individual qualities of the rollability are explained below:

++ no shift of the layer thicknesses, very easy detachment of the protective film without disturbances in the film + no shift of the layer thicknesses, easy detachment of the protective film without disturbances in the film − slight layer thickness variation in the edge region, the protective film is difficult to peel off without destroying the surface —— significant layer thickness variations in the edge region, severe "fraying" of the coating edge, the protective film is difficult to peel off and disturbances occur in the photopolymer

The invention claimed is:

1. A process for producing holographic films comprising
i) providing a photopolymer formulation comprising:
   A) matrix polymers as amorphous network,
   B) a combination of a monofunctional writing monomer and a polyfunctional writing monomer,
   C) a photoinitiator system,
   D) optionally a non-photopolymerizable component, and
   E) optionally catalysts, free radical stabilizers, solvents, additives and other auxiliaries and/or additives
ii) determining the plateau modulus $G_0$ of the photopolymer formulation by measuring the curing of the matrix in an oscillation rheometer, as follows:
   Oscillation measuring mode at a constant circular frequency $\omega_0$ of 10 rad/s and a regulated deformation amplitude of 1%;
   Temperature 50° C., normal force regulation set at 0 Newton
   Recording of the storage modulus G' over the measuring time up to a constant value Gmax of G' was reached or for not more than 3 hours; this value is taken as plateau modulus $G_0$;
iii) applying the photopolymer formulation as a film extensively to a substrate, and
iv) drying the film,
wherein the photopolymer formulation has a plateau modulus $G_0$ of ≥0.03 MPa.

2. The process according to claim 1, wherein the photopolymer formulation has a plateau modulus of from 0.03 to 1 MPa.

3. The process according to claim 1, wherein the photopolymer formulation has a plateau modulus of from 0.05 to 1 MPa.

4. The process according to claim 1, wherein the photopolymer formulation has a plateau modulus of from 0.1 to 1 MPa.

5. The process according to claim 1, wherein the photopolymer formulation has a plateau modulus of from 0.1 to 0.6 MPa.

6. The process according to claim 1, wherein the process further comprises applying a laminating film to the film after drying in step iii).

7. The process according to claim 6, wherein the film is rolled up together with the laminating film.

8. The process according to claim 1, wherein the matrix polymers comprise polyurethanes.

9. The process according to claim 1, wherein the writing monomers comprise acrylates and/or meth(acrylates).

10. The process according to claim 1, wherein the monofunctional writing monomer has the formula (III)

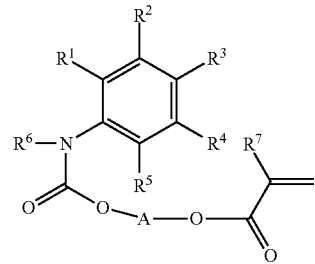

(III)

wherein
$R^2$, $R^3$, $R^4$, $R^5$, in each case independently of one another, represent hydrogen or halogen atom or a C1-C6-alkyl, trifluoromethyl, C1-C6-alkylthio, C1-C6-alkylseleno, C1-C6-alkyltelluro or nitro group, with the proviso that at least one substituent of the group $R^1$, $R^2$, $R^3$, $R^4$, $R^5$ is not hydrogen,
$R^6$, $R^7$, in each case independently of one another, represent hydrogen or a C1-C6-alkyl group and
A represents a saturated or unsaturated or linear or branched C1-C6-alkyl radical or a polyethylene oxide radical or a polypropylene oxide radical having in each case 2-6 repeating units in the polymer chain.

11. The process according to claim 10, wherein the monofunctional writing monomer has a glass transition temperature $T_G$ of <0° C. and a refractive index of >1.50 at 405 nm.

12. The process according to claim 1, wherein the polyfunctional writing monomer has a refractive index of >1.50 at 405 nm.

13. The process according to claim 1, wherein the photopolymer formulation comprises urethanes as a plasticizer.

14. The process according to claim 13, wherein the urethanes are substituted by at least one fluorine atom.

15. The process according to claim 14, wherein the urethanes have the formula (V)

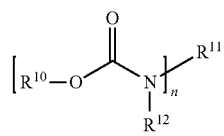

(V)

wherein
n is from 1 to 8 and
$R^{10}$, $R^{11}$, $R^{12}$ independently of one another, represent hydrogen or linear, branched, cyclic or heterocyclic organic radicals which are unsubstituted or optionally also substituted by heteroatoms.

16. The process according to claim 1, wherein the photoinitiator system comprises an anionic, cationic or neutral dye and a coinitiator.

17. The process according to claim 1, wherein in step ii) plate spacing is set to 250 μm.

* * * * *